US008732000B2

(12) United States Patent
Tijink et al.

(10) Patent No.: US 8,732,000 B2
(45) Date of Patent: May 20, 2014

(54) METHOD FOR DETERMINING TOLL FEES IN A ROAD TOLL SYSTEM

(75) Inventors: Jasja Tijink, Breitenfurt (AT); Jan Kersten, Oppenweiler (DE)

(73) Assignee: Kapsch TrafficCom AG, Vienna (AT)

( * ) Notice: Subject to any disclaimer, the term of this patent is extended or adjusted under 35 U.S.C. 154(b) by 218 days.

(21) Appl. No.: 13/489,109

(22) Filed: Jun. 5, 2012

(65) Prior Publication Data

US 2013/0006726 A1    Jan. 3, 2013

(30) Foreign Application Priority Data

Jun. 29, 2011    (EP) .................................... 11450085

(51) Int. Cl.
| | |
|---|---|
| *G07B 15/02* | (2011.01) |
| *G08G 1/123* | (2006.01) |
| *H04B 7/00* | (2006.01) |
| *G07B 15/06* | (2011.01) |
| *G08G 1/017* | (2006.01) |
| *G06Q 30/02* | (2012.01) |
| *G01S 19/12* | (2010.01) |

(52) U.S. Cl.
CPC .......... *G07B 15/063* (2013.01); *G06Q 2240/00* (2013.04); *G07B 15/02* (2013.01); *G08G 1/017* (2013.01); *G06Q 30/0284* (2013.01); *G01S 19/12* (2013.01)
USPC ............................ 705/13; 340/993; 455/66.1

(58) Field of Classification Search
CPC .. G07B 15/063; G07B 15/02; G06Q 2240/00; G06Q 30/0284; G08G 1/017; G01S 19/12
USPC ............................ 705/13; 340/993; 455/66.1
See application file for complete search history.

(56) References Cited

U.S. PATENT DOCUMENTS

| | | | | |
|---|---|---|---|---|
| 5,581,249 | A | * | 12/1996 | Yoshida ........................ 340/928 |
| 5,767,505 | A | | 6/1998 | Mertens et al. |
| 5,864,831 | A | * | 1/1999 | Schuessler ..................... 705/417 |
| 2002/0019689 | A1 | * | 2/2002 | Harrison et al. ................. 701/35 |
| 2003/0011494 | A1 | * | 1/2003 | Reider et al. ................... 340/993 |

(Continued)

FOREIGN PATENT DOCUMENTS

| | | |
|---|---|---|
| EP | 0 802 509 A2 | 10/1997 |
| EP | 2 325 807 A1 | 5/2011 |

OTHER PUBLICATIONS

Extended European Search Report for corresponding European Patent Application No. 11 450 085.3, dated Dec. 7, 2011, 4pp.

*Primary Examiner* — Brian Epstein
*Assistant Examiner* — Brian Tallman
(74) *Attorney, Agent, or Firm* — Piala & Weaver P.L.L.C.

(57) ABSTRACT

Method for determining toll fees for vehicles in a road toll system including vehicle-onboard units and positionally distributed beacons capable of communicating with the onboard units via radio signals. The method includes: providing a toll fee level and a validity time frame; retrieving an identifier of the onboard unit, the toll fee level and the validity time frame from the onboard unit as a data record; resetting the toll fee level, if the validity time frame has expired; increasing the toll fee level and storing the updated data record in the onboard unit and the beacon; transmitting a request for deletion of stored data records for this identifier to other beacons; transmitting the data record from the beacon to the central station, if no deletion request for the data record arrives within the validity time frame; and deleting the data record in the beacon.

14 Claims, 3 Drawing Sheets

(56) References Cited

U.S. PATENT DOCUMENTS

| | | | |
|---|---|---|---|
| 2003/0189498 A1* | 10/2003 | Kakihara et al. | 340/928 |
| 2006/0200379 A1* | 9/2006 | Biet | 705/13 |
| 2007/0275731 A1* | 11/2007 | Alfert et al. | 455/456.1 |
| 2008/0280624 A1* | 11/2008 | Wrappe | 455/456.1 |
| 2009/0024458 A1* | 1/2009 | Palmer | 705/13 |
| 2010/0287038 A1* | 11/2010 | Copejans | 705/13 |
| 2011/0090095 A1* | 4/2011 | Goldmann et al. | 340/928 |
| 2011/0125558 A1* | 5/2011 | Van Haperen et al. | 705/13 |
| 2011/0267470 A1* | 11/2011 | Povolny | 348/149 |

* cited by examiner

METHOD FOR DETERMINING TOLL FEES IN A ROAD TOLL SYSTEM

CROSS-REFERENCE TO RELATED APPLICATION(S)

This application claims priority to European Patent Application No. 11 450 085.3, filed on Jun. 29, 2011, the contents of which are hereby expressly incorporated by reference.

FIELD OF THE INVENTION

The present invention relates to a method for determining toll fees for vehicles in a road toll system comprising vehicle-supported onboard units with a respective unambiguous identifier and positionally distributed beacons with respective known locations, wherein beacons localize passing onboard units to the their beacon location in order to calculate position-related toll fees therefrom, and can communicate with the onboard units via radio.

BACKGROUND

More recent road toll systems locate vehicles, or more precisely the onboard units (OBUs), with the assistance of a network of geographically distributed beacons, e.g. short-range radio beacons. During the passage of an onboard unit, each beacon generates a transaction record for a central accounting station of the road toll system that contains the identifier of the onboard unit and the identifier of the beacon and therefore demonstrates the presence of the vehicle. A debit account of the user can be debited by a location-related roadway, time or regional toll using this data in the central station. Such road toll systems are distinguished by high reliability and a high degree of toll acquisition but could make it possible to trace the movement of the vehicle in the central station, which can be problematic from the point of view of data security.

SUMMARY

In some embodiments, the present invention is a method for determining toll fees for vehicles in a road toll system including vehicle-supported onboard units with respective unambiguous identifiers and positionally distributed beacons with known locations, wherein the beacons localize passing onboard units to their beacon location to calculate position-related toll fees therefrom, and are capable of communicating with the onboard units via radio signals. The method includes: storing a toll fee level and a validity time frame for the toll fee level in a memory in the onboard unit; in a beacon during the passing of the beacon by the onboard unit: retrieving the identifier, the toll fee level and the validity time frame from the memory as a data record; if the validity time frame has expired, resetting the toll fee level; increasing the toll fee level to update the data record and storing the updated data record in the memory of the onboard unit and the beacon; transmitting a request for deletion of stored data records for said identifier to other beacons; if no request for deletion of the stored data record arrives from other beacons during the validity time frame, transmitting the data record from the beacon to the central station; and deleting the data record in the beacon.

In some embodiments, the beacons are connected to one another via a first network and to a central station of the road toll system via a second one, and the transmitting of the deletion request to the other beacons takes place via the first network and the transmitting of the data record to the central station via the second network. The separation of the networks prevents any monitoring of the data transmission between the beacons by the central station, which further reduces possibilities for abuse. The separation of the networks can be realized logically and/or physically, e.g., by different wire-based data lines, different data channels in a radio network, different radio network technologies or different encryptions.

In some embodiments, the invention includes the following additional steps: storing a total counter and a section counter in the memory in the onboard unit; in the beacon: retrieving the total counter and the section counter from the onboard unit and placing them in the data record; resetting the section counter when the validity time frame has expired; incrementing the total counter and the section counter when updating the data record, and storing the data record in the onboard unit and the beacon; and, in the central station, if two data records with the same identifier arrive: deleting a data record with a lower total counter, if the difference between the total counters of the two data records is different from the section counter of a data record with a higher total counter.

With the above embodiments, it is possible to prevent residual errors in certain time constellations, specifically if, due to processing latencies in the beacons or transmission latencies between the beacons, the deletion request arrives slightly too late, for example by milliseconds, at a preceding station so that the latter has already transmitted its record to the central, although the next beacon has taken over the toll fee level. In this case, two overlapping data records regarding the beacons that have been passed could reach the central station, which would lead to billing errors. The evaluation according to the invention of a total and a sectional transaction counter prevents such infrequent latency-induced phenomena.

In some embodiments, the toll fee level is increased by a fixed value in each case and the section counter can thus be derived from the toll fee level itself, specifically by dividing by the aforementioned fixed value. This makes a special memory area for the section counter superfluous.

In some embodiments, the toll fee level is increased in each case by a variable value based on measurement data that is measured on a vehicle carrying the onboard unit. This way, a toll fee depending on the dimensions, number of axles, appearance, load, number of passengers, speed, etc., of the vehicle can be charged.

In some embodiments, which can be used alternatively or additionally, the toll fee level is increased in each case by a variable value that is dependent on stored data read out from the onboard unit. In that way, the onboard unit can contain data for its vehicle such as dimensions, number of axles, ownership, number of passengers etc., which determine the toll fee to be charged.

In some embodiments, an identifier and a time stamp of the beacon are stored in the onboard unit along with the updated record. This can be logged in the onboard unit as evidence of the transaction process of a beacon and can be read out for enforcement purposes.

In some embodiments, the identifiers and time stamps of at least those beacons that were passed by an onboard unit since the last reset of the toll fee level are stored in the onboard unit in an encrypted transaction log, which is retrieved from the beacons and sent to the central station when the data record is transmitted. The key for encrypting the transaction protocol is selected, for example, by the user of the onboard unit himself, or is only disclosed to him. The transaction log sent to the central station can be decrypted in case of conflict by the user—and only by the user—for use as proof, which increases the user acceptance without impairing the data protection relative to the central station.

The method of the present invention is suitable for any type of road toll system with geographically distributed locating beacons, such as beacons that can localize onboard units optically to their station. The method of the present invention is particularly suitable for road toll systems in which the beacons communicate with the passing onboard units via radio connections with limited coverage range and thereby localize the onboard unit to their respective radio coverage range, which results in high reliability.

BRIEF DESCRIPTION OF THE DRAWINGS

The invention will be explained in detail below with reference to embodiment examples illustrated in the attached drawings. In the drawings.

DETAILED DESCRIPTION

The present invention creates a secure data protection solution for centrally billed ("postpaid") onboard units that are located by a distributed beacon network. The toll fee level of an onboard unit is transported with the aid of the onboard unit itself from beacon to beacon and only the respective last beacon in an interrupted chain of successive validity time periods transmits the accumulated toll fee level to the central station. The last beacon in each case is determined automatically from an interruption of the chain of validity time frames. For example, the most recent validity time frame, each beacon stores the previously accumulated toll fee level and, if no deletion request or notification that it has increased the toll fee arrives from a different beacon during this period, then the beacon decides that it is the last of a chain and initiates the transmission of the cumulated toll fee level to the central station. The data records stored in the beacons are thus deleted in every case, either when a deletion request arrives from a different beacon or after expiration of the validity time frame and transmission to the central station. In this manner, the knowledge of position-related individual transactions remains hidden from the central station.

The validity time frame can be specified or agreed system-wide, or can be individually set by each beacon in order, for example, to take into account the different distances between the beacons. Thus for example, a beacon that is far away from the next one will determine a longer validity time frame and write it in the record of the onboard unit, whereas a beacon that is a short distance away from the next one will set a shorter validity time frame.

The validity time frames are selected in such a manner that, with an average travel speed of a vehicle from one beacon to the next one, the validity time frame of the most recent toll fee level has not yet expired, when the onboard unit reaches the next beacon. Thus, an expiration of the validity time frame, i.e., an interruption of the chain and therefore transmission of the toll-fee level to the central station occurs only in exceptional cases, for example, stopping during the trip, turning onto a different street, etc.

Consequently, only data records containing a toll fee level accumulated over several beacon locations normally arrive in the central station and thus do not allow any precise inferences of the individual beacon locations. As a result, a high data security or confidentiality for the sensitive movement data of the onboard units is achieved while simultaneously maintaining the post-pay billing functionality in the central station.

Figure 1:
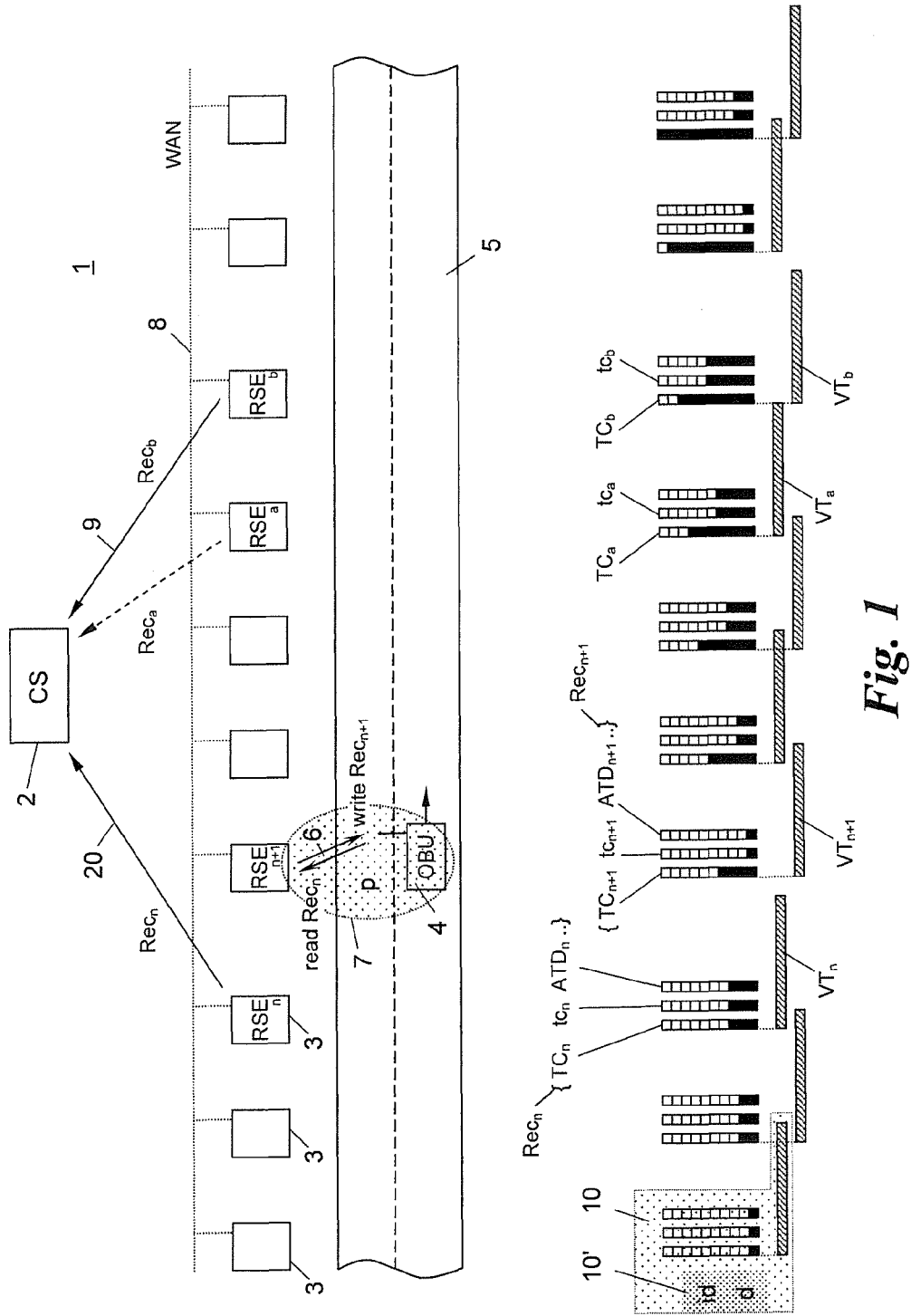
FIG. 1 schematically shows an exemplary road toll system with a graphical representation of data in the onboard unit at various time points, according to some embodiments of the present invention.

FIG. 1 schematically shows an exemplary road toll system 1 that comprises a central station ("central system," CS) 2 and a plurality of geographically distributed beacons ("roadside equipment," RSE) 3 that interact with vehicle devices or onboard units (OBUs) 4. The onboard units 4 are carried in vehicles (not shown) that are moving on a road network 5. A location-related, time-dependent and/or travel path-dependent toll fee for the vehicles is determined with the aid of the beacons 3 and the onboard units 4 and is charged in the central station 2.

For this purpose, each beacon 3 can localize a passing onboard unit 4 to its beacon location p, specifically by setting up a radio connection 6 with the onboard unit 4 using a radio coverage range 7 limited to the beacon location p. A successfully set up radio connection 6 shows the presence of the onboard unit 4 in the radio coverage range 7 and thus at the beacon location p.

In some embodiments, the radio connection 6 is established according to the dedicated short range communication (CEN DSRC) standard, wireless access in a vehicle environment (IEEE WAVE) standard, or the ETSI ITS-G5 standard. In place of a radio connection 6, a different wireless short-range connection could also be used, for example an infrared connection, ultrasound connection, etc. can be used to establish the connection 6.

In some embodiments, during the passage of an onboard unit 4 in conventional road toll systems, each beacon 3, hereinafter also referred to in general as $RSE_n$ (n=1, 2, 3, . . . ), generates a transaction data record $Rec_n$ for the central station 2 that contains at least an identifier of the onboard unit 4 and an identifier of the beacon 3, from which, with knowledge of the beacon locations p, the position usages of the onboard unit 4 can be charged in the central station 2. The method of the present invention described below is used to prevent the path of an onboard unit 4 on the road network 5 from being tracked.

The radio beacons 3 are connected to one another via a first network 8, e.g., a local area network (LAN) or wide area network (WAN), either wireless or wire-based. Each beacon 3 can also store transaction data records $Rec_n$ at the central station 2 via a second network 9 separate from the first network 8. The second network 9 can likewise be a LAN or WAN, either wireless or wire-based. In some embodiments, the first and second networks 8, 9 can be connected via one and the same physical network, for example, the Internet, a cellular radio network, a dedicated fiber optic network, etc. The first and second network 8 and 9 are merely logically separated from one another, for example by mutually isolated virtual private networks (VPNs), so far as the central station 2 cannot monitor the data connections of the beacons 3 among one another, i.e., in the first network 8.

In the individual onboard units 4, memories 10 are set up whose contents are schematically illustrated in the lower half of FIG. 1 at different points in time, in each case immediately after passage of a beacon 3 or $RSE_n$ along the road network 5. The memory 10 of each onboard unit 4 contains at least one toll fee level ATD ("aggregated total debt") and one validity time frame VT ("validity time"), as well as optionally a total counter TC ("transaction counter") and a section counter tc. Another area $10'$ of the memory 10 can contain semipermanent data such as the identifier id of the onboard unit 4 and vehicle or user specific additional data d, for example.

At the beginning of the method, e.g., at the initial delivery of the onboard unit 4, the toll fee level ATD, the total counter TC, the section counter tc and the validity time frame VT are all set to zero.

Figure 2:
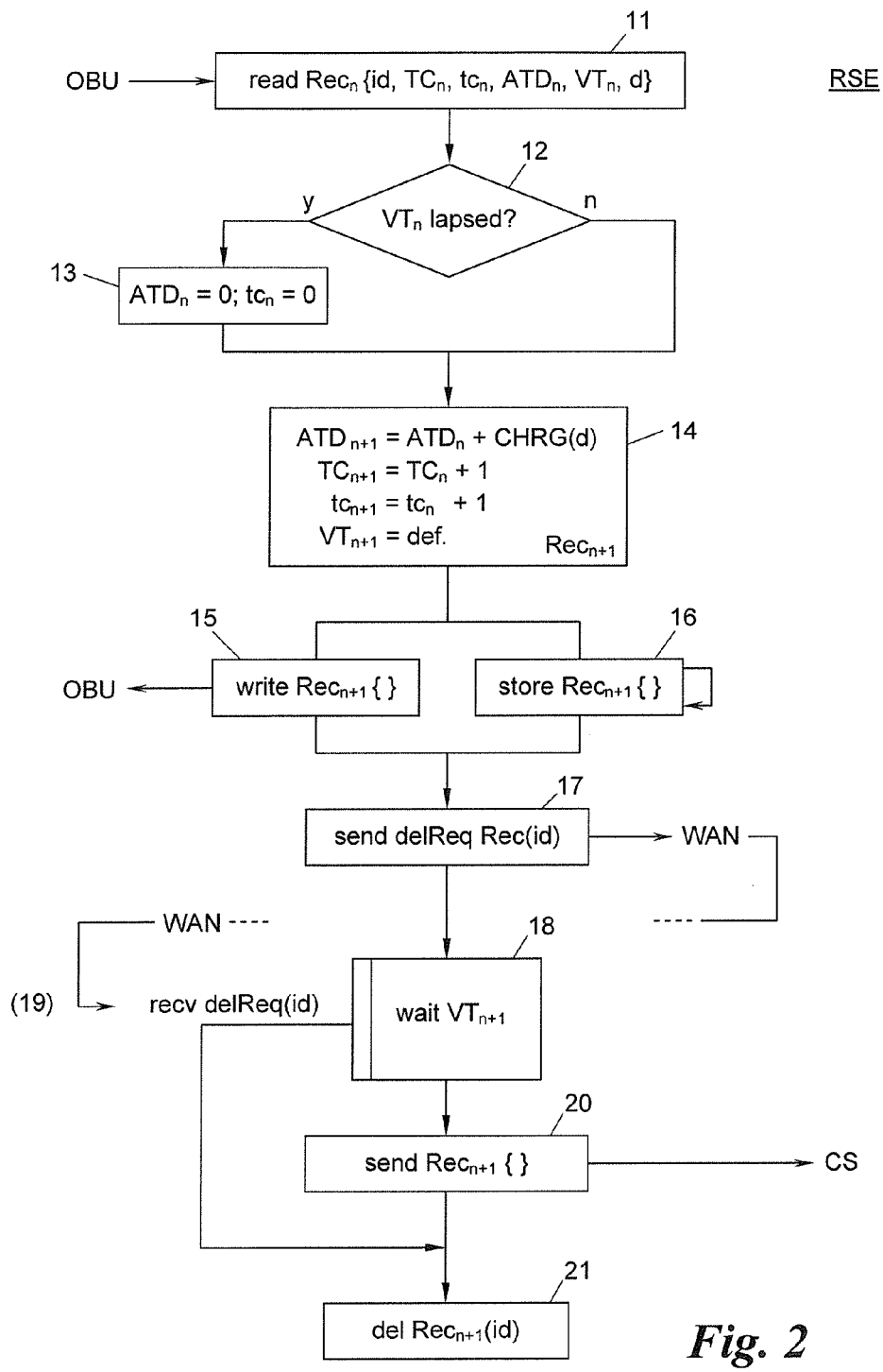
FIG. 2 shows an exemplary flow diagram in the beacons of a road toll system, according to some embodiments of the present invention.

FIG. 2 shows an exemplary method that is executed in each beacon 3, here $RSE_{n+1}$ for illustrative purposes when an onboard unit 4 passes, i.e., enters its radio coverage range 7 and temporarily sets up a radio connection 6 with the beacon. FIG. 2 shows the part of the communication protocol for the radio connection 6 that is relevant to the present method. Known communication steps such as handshaking, transmission of checksums and acknowledgments are not shown for simplicity purpose.

In block 11, the contents of the memory 10 of a passing onboard unit 4 are read out by the beacon $RSE_{n+1}$, for example, the identifier id of the onboard unit 4, the most recently stored toll fee level $ATD_n$ and its validity time frame $VT_n$. In some embodiments, the most recent total and section counters $TC_n$, $tc_n$ can also be read out as described later with reference to FIG. 3. However, in a simplified embodiment, the references below to the total and section counters TC, tc can be omitted. Moreover, the additional data d can optionally be omitted. The read-out data $\{id, TC_n, tc_n, ATD_n, VT_n, d\}$ is compiled in the beacon $RSE_{n+1}$ into a data record $Rec_n$.

In block 12, it is checked whether the read-out validity time frame $VT_n$ has expired or run out. This can be realized in various manners. For example, the value $VT_n$ can indicate an absolute final point in time that can be compared to the current clock time, or it can comprise a starting time point and the length of the validity time window, for example 5 minutes. The validity time frame $VT_n$ indicates the time for which the read-out toll fee level $ATD_n$ is "still valid." If the validity time frame $VT_n$ has run out (branch "y"), the decision of block 12 branches to a block 13, in which both the toll fee level $ATD_n$ and the optional section counter $tc_n$ are reset to 0. In the other case (branch "n"), block 13 is skipped and control proceeds directly to block 14.

In some embodiments, the following updates are undertaken in block 14:
  the toll fee level $ATD_n$ is increased by a value CHRG that corresponds to a toll fee for the use of the location p of the beacon $RSE_{n+1}$, in order to generate an updated toll fee level $ATD_{n+1}$. The value CHRG can be a fixed predetermined value or a variable value determined based on various criteria, e.g., the beacon location P in the memory data d read out of the onboard unit 4, which can indicate the vehicle class, the dimensions, the weight, the load or the number of passengers, etc., of the vehicle carrying the onboard unit 4. Furthermore, the volume CHRG can be based on measurement data obtained by the beacon $RSE_{n+1}$ from the onboard unit 4 or its vehicle, such as its dimensions, appearance (class), weight, speed, number of passengers, etc.;
  the optional total counter $TC_n$ is incremented in order to generate an updated total counter $TC_{n+1}$;
  the optional section counter $tc_n$ is incremented in order to generate an updated section counter $tc_{n+1}$; and
  the validity time frame $VT_{n+1}$ can (optionally) be determined again, e.g. based on the beacon location, on measured values of the vehicle as mentioned above, on read-out memory data d from the onboard unit 4, etc.

An updated data record $Rec_{n+1}$ is obtained at the end of block 14.

In blocks 15 and 16, which can be performed in an arbitrary order or in parallel, the updated data record $Rec_{n+1}$ is written back into the onboard unit 4 via the radio connection 6 (block 15) and is stored in the beacon $RSE_{n+1}$ (block 16). Thereby the new toll fee level $ATD_{n+1}$ is secured in two ways, in the onboard units 4, and (temporarily) in the beacon 3 or $RSE_{n+1}$.

In block 17, a deletion request delReq can be sent by the first data network 8 to all other beacons 3, or at least to the immediately preceding beacons 3 in the road network 5, indicating the identifier of the onboard unit 4, to delete all data records Rec (id) still stored in these beacons 3. How these beacons 3 proceed with such a deletion request can be immediately explained with reference to the present beacon $RSE_{n+1}$, because it now also waits for such a deletion request from other beacons. The method now transitions into a waiting state 18 in which the beacon waits for the arrival of a deletion request delReq (19), but only until the validity time frame $VT_{n+1}$ expires. In other words, the waiting state 18 terminates by expiration of the validity time frame $VT_{n+1}$ or by the arrival of a deletion request delReq.

If no deletion request delReq arrives, i.e., the validity time frame $VT_{n+1}$ simply expires, the updated data record $Rec_{n+1}$ is transmitted in a block 20 via the second data network 9 to the central station 2. If a deletion request delReq is received within the validity time frame $VT_{n+1}$, however, block 20 is skipped and there is a branch directly to block 21 of the method.

In block 21, the data record $Rec_{n+1}$ stored in the beacon 3 is deleted. The method in a beacon 3, explained here for representative purposes with reference to the beacon $RSE_{n+1}$, is therefore terminated. The method is executed again at each passage of a beacon 3 by an onboard unit 4.

Accordingly, the successive passes of an onboard unit 4 past successive beacons 3 ( ... $RSE_{n+1}$, $RSE_n$, $RSE_{n+1}$ ... ) yield the schematically shown values or "fill levels" shown at the bottom of FIG. 1 for the toll fee level ATD, the total counter TC and the section counter tc during the respective validity time frame VT. As can be seen from FIG. 1, if the validity time frame VT for a beacon passage has not yet expired, the toll fee level and the total and section counters Tc, tc are incremented; see the first three beacon passages. At the fourth beacon passage, at beacon $RSE_{n+1}$, the preceding validity time frame $VT_n$ had already expired, so that the toll fee level ATD and the section counter tc were reset. At the same time, the waiting time $VT_n$ in the preceding beacon $RSE_n$ in the waiting state 18 had already expired, so that the beacon $RSE_n$ sends its data record $Rec_n$ to the central station 2 (block 20). The transmitted data record $Rec_n$ contains a toll fee level ATD accumulated over three beacon passages, which no longer allows any inferences of the individual beacons 3 and therefore the locations p, so that positional anonymity is achieved by section-by-section accumulation.

In very infrequent time constellations, due to the latency of the data processing in the beacons 3 or the latency of the data transmission between the beacons 3, it is possible that the deletion request delReq transmitted from a subsequent beacon $RSE_b$ arrives too late in one of the preceding beacons $RSE_a$ to suppress transmission of the data record there, even though the subsequent beacon $RSE_b$ assessed the validity time frame $VT_0$ as not having elapsed and increased the toll fee level ATD. Optional embodiments of the invention described with reference to FIG. 3 is used to prevent such latency-induced errors.

Figure 3:
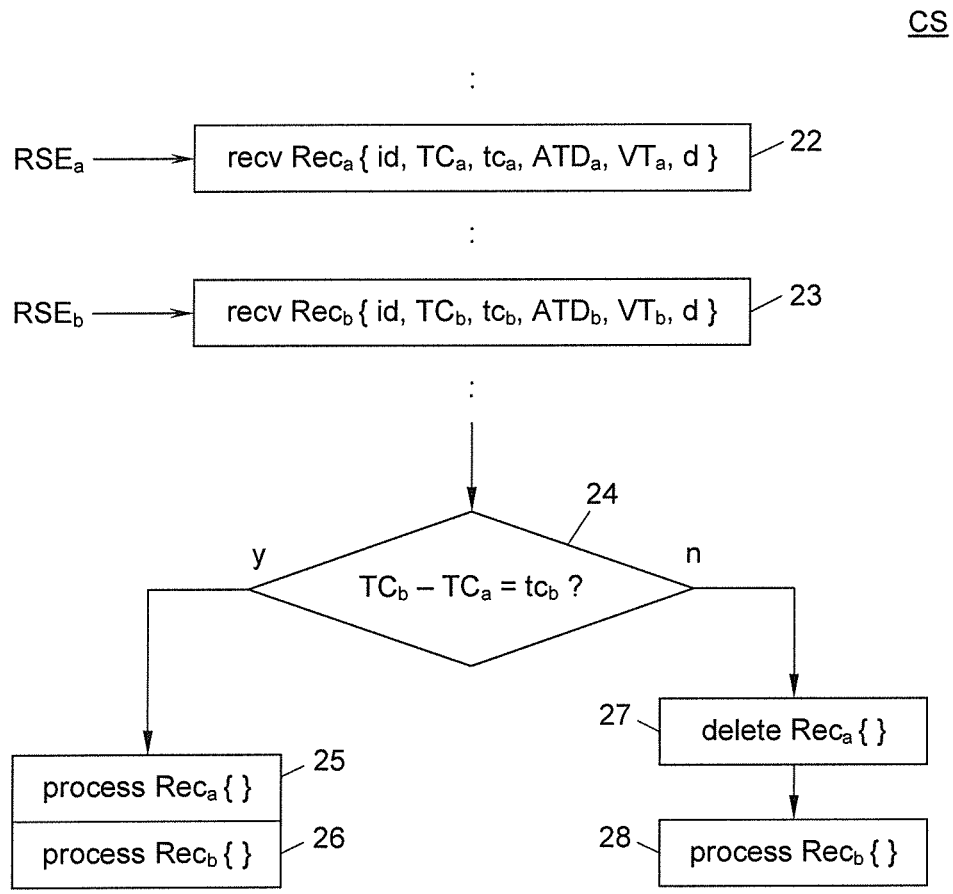
FIG. 3 shows an exemplary flow diagram executed in a exemplary central station of a road toll system, according to some embodiments of the present invention.

FIG. 3 shows a portion of the method that runs in a central station and evaluates the total counter TC and the section counter tc to take latency-induced double transmissions of data records $Rec_a$, $Rec_b$ into account. If two data records $Rec_a$, $Rec_b$ with one and the same identifier id arrive at the central station 2 (blocks 22 and 23), then there is a check in a decision block 24 of whether the difference $TC_b$-$TC_a$ of the total counters for the two data records $Rec_a$, $Rec_b$ corresponds to the section counter $tc_b$ of the second data record $Rec_b$, i.e., the data record with the higher total counter $TC_b$. If yes (branch "y"), then everything is in order and both data records $Rec_a$, $Rec_b$ can be processed in the central station 2, see blocks 25 and 26. If no (branch "n"), then there is an overlapping or double transmission, the data record $Rec_a$ with the lower total counter $TC_a$ is deleted (block 27) and only the second data record $Rec_b$ is processed (block 28).

If the value CHRG by which the toll fee level ATD is raised in each block is a fixed predetermined value, it is possible to forgo the separate formation of the section counter tc, because the section-by-section number tc of transactions can be directly derived from the toll fee level ATD, divided by the above-mentioned fixed value.

In block 15, an identifier of the beacon 3 and the current time stamp can be saved in the onboard unit 4 as evidence. In particular, the evidence is stored in the onboard unit 4 in the form of an encrypted transaction log. The key for encrypting the transaction log is selected, for example, by the user of the onboard unit 4 himself, or is only disclosed to him. The transaction log can be read out from an onboard unit 4 in block 11 and sent in block 20 to the central station 2, so that encrypted transaction protocols are collected there, which can only be read out as evidence by the respective owner using his key.

In some embodiments, the radio connections 6, in particular all the transmission and reception blocks 11, 15, 20, 22, 23 shown in FIGS. 2 and 3, are encrypted and/or furnished with electronic signatures of the onboard unit 4, or the beacon 3 to increase the transaction security.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for determining toll fees for vehicles in a road toll system including vehicle-supported onboard units with respective unambiguous identifiers and positionally distributed beacons with known locations, wherein the beacons localize passing onboard units to their beacon location to calculate position-related toll fees therefrom, and are capable of communicating with the onboard units via radio signals, the method comprising:

storing by an onboard unit a toll fee level and a validity time frame for the toll fee level in a memory in the onboard unit;

in a beacon during a passing of the beacon by the onboard unit:

retrieving by the beacon the identifier, the toll fee level and the validity time frame from the memory as a data record;

resetting by the beacon the toll fee level upon determining the validity time frame has expired;

increasing by the beacon the toll fee level to update the data record, and storing by the beacon the updated data record in the beacon;

transmitting by the beacon a request for deletion of stored data records for said identifier to other beacons;

transmitting by the beacon the updated data record from the beacon to a central station upon determining by the beacon that there is no request for deletion of the stored data record that has arrived at the beacon from one of the other beacons during the validity time frame; and deleting by the beacon the updated data record in the beacon.

2. The method according to claim 1, wherein the beacons are connected to one another via a first network, and to the central station of the road toll system via a second network, and wherein the transmitting of the deletion request to the other beacons takes place via the first network and the transmitting of the updated data record to the central station takes place via the second network.

3. The method according to claim 1, further comprising:

storing by the onboard unit a total counter and a section counter in the memory in the onboard unit;

in the beacon:

retrieving by the beacon the total counter and the section counter from the onboard unit and placing them in the data record;

resetting by the beacon the section counter when the validity time frame has expired;

incrementing by the beacon the total counter and the section counter when updating the data record, and storing by the beacon the updated data record with the total counter and section counter in the beacon; and, in the central station, upon determining that two data records with the same identifier arrive:

deleting a data record of the two data records with a lower total counter upon determining that the difference between the total counters of the two data records is different from the section counter of a data record of the two data records with a higher total counter.

4. The method according to claim 3, wherein the toll fee level is incremented by a fixed value and the section counter is formed from the toll fee level divided by the fixed value.

5. The method according to claim 1, wherein the toll fee level is incremented by a variable value that is determined based on data measured on a vehicle carrying the onboard unit.

6. The method according claim 1, wherein the toll fee level is incremented by a variable value determined based on data retrieved from the onboard unit.

7. The method according to claim 1, wherein when updating the data record, the validity time frame is set to a beacon-specific value.

8. The method according to claim 1, wherein an identifier and a time stamp of the beacon are stored in the memory of onboard unit along with the updated data record.

9. The method according to claim 8, wherein the identifiers and time stamps of beacons that were passed by the onboard unit since a last reset of the toll fee level are stored in the onboard unit in an encrypted transaction log, which is read out by said beacons and sent to the central station when the data record is transmitted.

10. The method according to claim 1, wherein the beacon communicates with the passing onboard unit via a radio connection in a radio coverage range and localizes the onboard unit to the radio coverage range as the beacon location.

11. The method according to claim 1, wherein the beacons are connected to one another via a first network, and to the central station of the road toll system via a second network, and wherein the transmitting of the deletion request to the other beacons takes place via the first network and the transmitting of the data record to the central station takes place via the second network, and wherein the method further comprises:

storing by the onboard unit a total counter and a section counter in the memory of the onboard unit;

in the beacon:
retrieving by the beacon the total counter and the section counter from the memory of the onboard unit and placing them in the data record;
resetting by the beacon the section counter when the validity time frame has expired;
incrementing by the beacon the total counter and the section counter when updating the data record, and storing by the beacon the incremented section counter in the beacon; and
sending by the beacon the incremented section counter to the onboard unit; in the onboard unit:
storing by the onboard unit the incremented section counter in the memory of the onboard unit;

in the central station, upon determining that two data records with the same identifier arrive:
deleting a data record of the two data records with a lower total counter upon determining that the difference between the total counters of the two data records is different from the section counter of a data record of the two data records with a higher total counter.

12. The method according to claim 11, wherein the toll fee level is incremented by a fixed value and the section counter is formed from the toll fee level divided by the fixed value.

13. The method according to claim 1, further comprising:
sending by the beacon the updated data record to the onboard unit; and
storing by the onboard unit the updated data record in the memory of the onboard unit.

14. The method according to claim 3, further comprising:
sending by the beacon the updated data record with the total counter and the section counter to the onboard unit; and
in the onboard unit:
storing by the onboard unit the updated data record with the total counter and the section counter in the memory of the onboard unit.

* * * * *